Patented Feb. 18, 1930

1,747,177

UNITED STATES PATENT OFFICE

ARTHUR ROMAYNE MOBERG, OF MINNEAPOLIS, MINNESOTA, ASSIGNOR TO FRED O. PAIGE, JR., OF HAMMOND, INDIANA

FERRIC ALUMINA

No Drawing. Application filed April 15, 1929. Serial No. 355,432.

The present invention relates to a composition of matter adapted for use in the purification of liquids and solutions and more particularly for use in the purification of water for industrial and municipal use. It has for its general object the provision of an iron and aluminum containing coagulant capable of economically, efficiently, and conveniently effecting the removal of suspended or colloidal matter present in such liquids.

Heretofore, in processes for the purification of water in which coagulants are used, it has been the practice to add coagulants such as copperas or ferric chloride which are capable of precipitating ferric hydroxide. To obtain substantially complete precipitation of the ferric hydroxide with such reagents it has been found that the water must possess sufficient alkalinity to give it a pH value of 8.5 or greater. Likewise, when coagulants such as aluminum sulphate are used to precipitate aluminum hydroxide, the water must have a degree of alkalinity low enough to give it a pH value of 8.0 or less since the alumina tends to remain in solution or fails to precipitate with substantial completeness when the coagulant is applied to waters having a greater degree of alkalinity.

An object of the present invention is the provision of a coagulant which will precipitate its ferric and aluminum hydrates with substantial completeness over the entire range of alkalinity ordinarily found practical for use with coagulants. This and other desirable advantages are accomplished by the production of a coagulant comprising a solution of ferric chloride in which aluminum hydrate in substantially amount is dispersed in peptized form. The material may be otherwise described as a commercially suitable concentration of a colloidal sol of hydrous alumina oxide peptized by the addition of ferric chloride.

The following is a specific example of the method of making my improved coagulant. It is to be understood, however, that my invention is not restricted to the details given in the example but that it is merely given by way of illustration of an embodiment of my invention.

133 pounds of aluminum chloride ($AlCl_3$, $6H_2O$) are dissolved in 40 gallons of water. To this is added an amount of ammonium hydroxide sufficient to precipitate hydrated alumina, approximately 51 pounds, and the precipitated hydrous alumina is then separated by filtration from the mother liquors. 270 pounds of a ferric chloride solution of substantially 25 Bé. strength are then added to the separated hydrous alumina and the resulting mixture is stirred, whereupon a stable mixture is obtained which is my finished product. Hydrous alumina prepared by any other method may be employed and the proportions of the chemicals may be varied in order to vary the concentration. A drop of this mixture added to turbid water having any degree of alkalinity found practical for use with coagulants will cause the quick and substantially complete precipitation of a mixed aluminum and ferric hydroxide with resultant coagulation of the turbidity of the water.

The above coagulant is equally effective when applied to either waters in which the turbidity is naturally present or to waters in which the turbidity is the result of some chemical process to which the water has been subjected, for example, the softening of water by the precipitation process otherwise known as the lime-soda process. By removing the suspended or colloidal salts remaining after the softening process mentioned, a softer water can be obtained.

Having thus described my invention, what I claim as new and desire to secure by Letters Patent of the United States is as follows:

1. An improved coagulant for clarifying aqueous liquids comprising a solution of ferric chloride containing peptized hydrous alumina.

2. An improved iron containing coagulant comprising a concentrated solution of ferric chloride in which peptized aluminum hydrate is present in such amount that the relationship of aluminum to iron shall vary between one to five and one to one.

3. The method of preparing an iron and alumina containing coagulant for purifying aqueous liquids which consists in subjecting a colloidal sol of hydrous alumina to the peptizing action of a concentrated solution of ferric chloride in the presence of water.

4. The method of preparing an iron containing coagulant for purifying aqueous solutions which consists in subjecting a hydrate of alumina to the peptizing action of a concentrated solution of ferric chloride.

5. The method of preparing an iron containing coagulant for clarifying aqueous liquids which comprises the adding of hydrated alumina to a concentrated solution of ferric chloride, and stirring the resulting mixture.

6. The method of preparing an iron containing coagulant which comprises the steps of dissolving aluminum chloride in water, adding a sufficient amount of ammonium hydroxide to precipitate hydrated alumina, filtering the hydrated alumina, and mixing the filtered hydrated alumina with a concentrated solution of ferric chloride.

7. The method of preparing an iron containing coagulant which comprises the steps of dissolving 8 parts by weight of aluminum chloride in substantially 20 parts by weight of water, adding substantially 3 parts by weight of ammonium hydroxide to precipitate hydrated alumina, filtering the hydrated alumina, and mixing the filtered hydrated alumina with substantially 16 parts by weight of a concentrated solution of ferric chloride.

In testimony whereof, I have hereunto set my signature.

A. ROMAYNE MOBERG.